United States Patent

[11] 3,567,123

[72] Inventor  Jack M. Mitchell
              642 N. 17th Ave., Phoenix, Ariz. 85007
[21] Appl. No. 840,392
[22] Filed     July 9, 1969
[45] Patented  Mar. 2, 1971

[54] PORTABLE ROAD SURFACING PLANT
     3 Claims, 3 Drawing Figs.
[52] U.S. Cl. .................................................... 239/159,
              239/131, 239/172, 239/304, 239/325
[51] Int. Cl. ................................................... B05b 1/20
[50] Field of Search ........................................... 94/19, 23,
              39, 40, 42, 44; 259/154; 239/159, 172, 304, 325, 131

[56]                References Cited
                UNITED STATES PATENTS
2,352,749  7/1944  Wills ........................... 239/325X
3,341,128  9/1967  Nagin et al. ................... 239/304X Primary Examiner—Lloyd L. King
Attorney—Willard L. Groene ABSTRACT: A portable road-surfacing plant for storing, combining, mixing and applying at high temperatures predetermined proportions of asphalt and rubber.

PATENTED MAR 2 1971 3,567,123

INVENTOR.
JACK M. MITCHELL.
BY
Willard S. Severn
ATTORNEY.

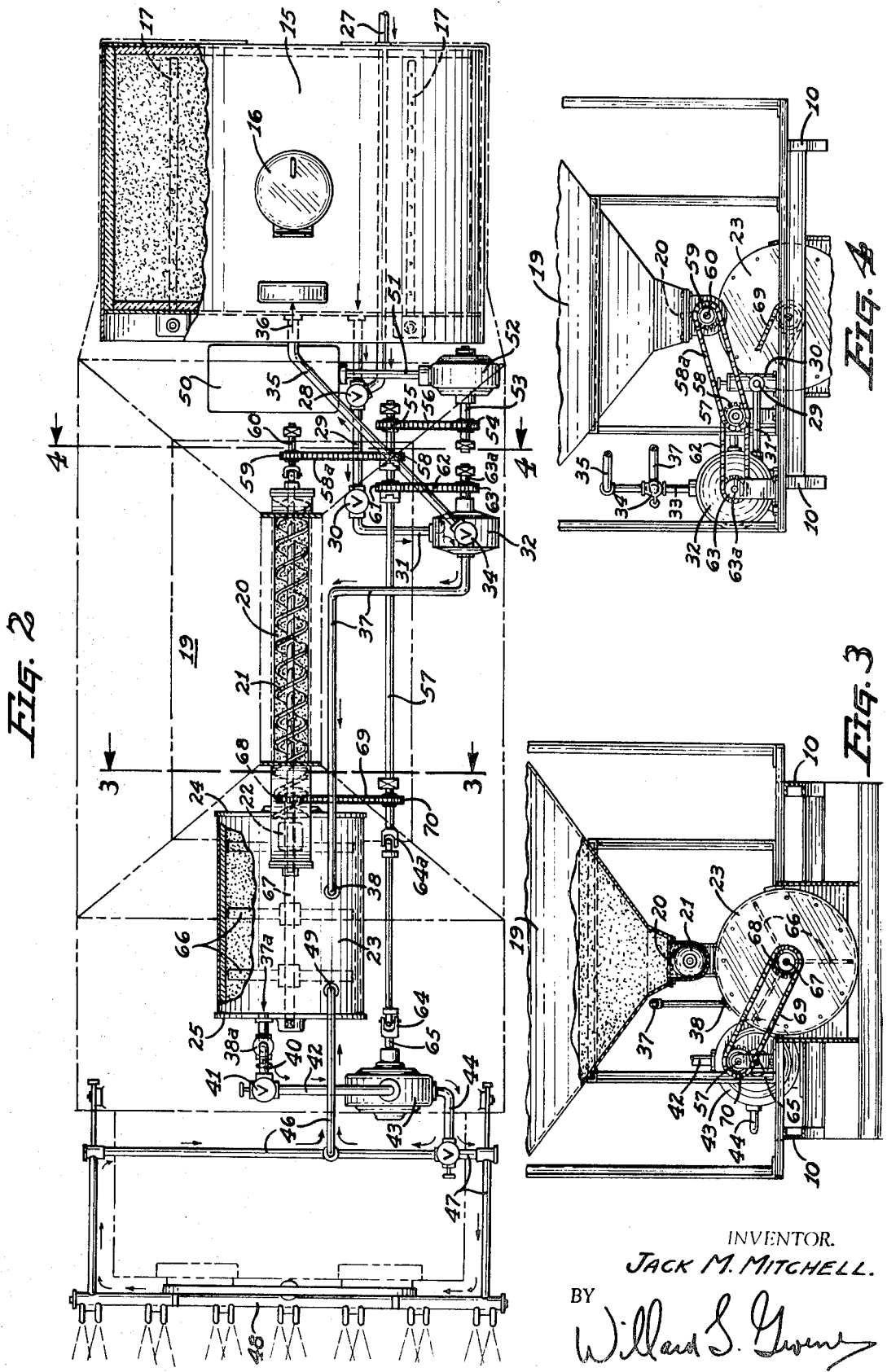

PORTABLE ROAD SURFACING PLANT

BACKGROUND OF THE INVENTION

1. This invention pertains to material storage, combining in proper proportions, mixing, and applying to a road surface, and is particularly directed to apparatus that stores, combines, mixes, and applies rubber and asphalt in a continuous manner to a pavement surface.

2. Applicant has found that in order to produce a mixture of rubber and asphalt successfully to a road surface in a continuous manner that will provide an adequate weather seal, and prevent cracks from surfacing, the following requirements, lacking in the prior art, are required:

a. The percentage of rubber in the rubber-asphalt mix must be at least 25 percent to produce a sufficiently stable mix.

b. In order that the mix be stable, the rubber may not exceed 35 percent.

c. To produce the proper homogeneous mixture, it is necessary that the temperature exceed 400° F.

d. In order to apply a consistent mix, it is imperative that the material be applied no longer than 5 minutes after the materials are combined, so that when the subject material are initially combined there is an approximate 30 percent volume increase, which produces a mixture to be applied uniformly through a spray bar However, the density of the material begins immediately to increase the viscosity of the mix to a point beyond which it cannot be applied through a spray bar

SUMMARY OF THE INVENTION

One object of this invention is to provide a portable storage, combining, mixing, and application plant that will accurately handle the materials, rubber and asphalt.

Another object is to accurately control the percentages of rubber and asphalt in the mix such that the percentage of rubber be established at a predetermined amount between 25 percent and 35 percent.

Still another object is to provide storage for both materials and in addition provide a means for bypassing the asphalt storage and utilize asphalt from an external source which can be temporarily attached to the subject invention.

Also an object is to feed rubber into the mixer at a predetermined rate by the use of a screw-type auger located at the bottom of the rubber hopper and extending to the input of the mixer.

Another object is to pump asphalt at a predetermined temperature and rate to the mixer but beyond the input end to provide assurance that the rubber is mixed with the asphalt so that dry rubber cannot be pumped out of the mixer.

Still another object is to provide flow of material from storage through mixer and to applicator such that retention in the mixer is limited to a maximum of 5 minutes.

It is also an object to control the rate of application to a predetermined amount.

And still another object is that rubber tends to form in clods which would prevent proper mixing, so that an auger breaks up these clods prior to feeding into the mixer.

BRIEF DESCRIPTION OF THE DRAWINGS

FIG. 2 is a right-hand side elevation of the portable road-surfacing plant incorporating the feature of this invention.

FIG. 2 is a top plan view, partly broken away and in phantom, to more clearly show the significant part of the plant shown in FIG. 1.

FIG. 3 is an enlarged fragmentary transverse section on the line 3—3 of FIG. 2.

FIG. 4 is an enlarged fragmentary transverse section on the line 4—4 of FIG. 2.

DESCRIPTION OF THE PREFERRED EMBODIMENT

Figure 1:
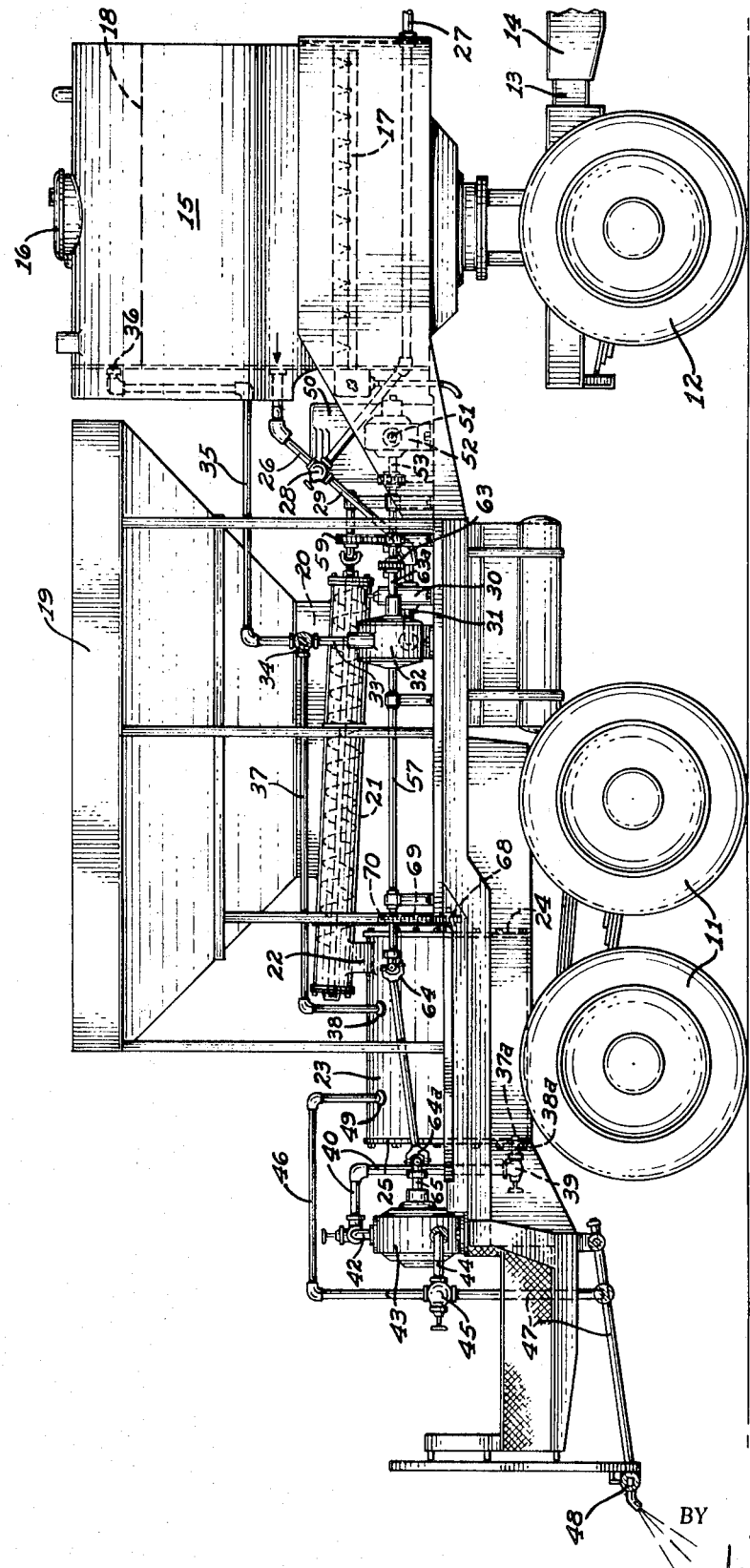

As an example of one embodiment of this invention, there is shown a portable road-surfacing plant having a frame 10 suitably supported on road wheels 11 and 12, and connected by a suitable hitch 13 to the frame of a towing vehicle 14. On the front portion of the frame 10 is mounted a hot asphalt supply tank 15 having an access cover 16 to be opened when charging asphalt in the tank and a suitable gas burner 17 for maintaining the proper temperature for the asphalt 18 in the tank.

Intermediate the ends of the frame 10 is mounted the rubber supply hopper 19 discharging at its bottom out through a discharge slot 20 into a screw conveyor 21 having a discharge port 22 discharging at the top rear portion of a mixing tank 23 mounted on the rear portion of the frame 10. The mixing tank is provided with a suitable demountable front bulkhead 24 and a rear bulkhead 25 for servicing the interior of the tank.

Hot asphalt from the tank 15 is delivered through the line 26 or from an auxiliary line 27 from an external source, not shown, to the selector valve 28, then through the line 29 to the regulating valve 30, and then line 31 to the intake of the asphalt circulating pump 32. Discharge from the pump 32 passes through the line 33 to the selector valve 34 which is connected through line 35 to the top input port 36 of the asphalt tank 15 and through a line 37 which is connected to a port 38 in the mixing tank 23 rearwardly of the rubber discharge port 22.

Discharge from the mixing tank 23 passes out through the discharge port 37a into discharge line 38a to the regulating valve 39 then through line 40 and the regulating valve 41 and line 42 to the intake of the mixture pump 43. Discharge from the pump 43 passes through the line 44 to selector valve 45 which may connect line 44 to the recirculating lines 46 or to discharge line 47 suitably connected to the spray bar 48 mounted on the rear of the frame 10, the line 46 being connected to the port 49 of the mixing tank located rearwardly of the discharge port 38 and adjacent the rear bulkhead 25.

The pumps 32 and 43 and the screw conveyor 21 are driven from a suitable drive motor 50 mounted on the frame 10 having an output shaft 51 connected to a speed reducing transmission 52 having an output shaft 53 with a sprocket 64 over which operates a chain 56 in turn operating over a sprocket 55 on the countershaft 57 suitably journaled on the frame 10. A sprocket 58 disconnectably clutched to the countershaft 57 has a chain 58a which operates over a sprocket 59 fixed to the drive shaft 60 for the screw conveyor 21. A sprocket 61 disconnectably clutched to the countershaft 57 has a chain 62 operating over the sprocket 63 fixed to the drive shaft 63a for driving the pump 32. The pump 43 is driven by the countershaft 57 through suitable couplings 64 and 64a to the drive shaft 65 of the pump 43.

Within the mixing tank 23 there is provided a series of mixing paddles 66 mounted on a centrally positioned shaft 67 suitably journaled in the bulkheads 24 and 25 thereof. A sprocket 68 is driven by a chain 69 from the sprocket 70 on the countershaft 57.

I claim:

1. A portable road-surfacing plant comprising in combination:

A. a frame;
   B. road wheels to transportably support the frame;
   C. a hot asphalt supply tank mounted on the frame;
   D. a rubber supply hopper mounted on the frame;
   E. a mixing tank mounted on the frame;
   F. a spray bar mounted on the rear end of the frame;
   G. a hot asphalt circulating pump connected to circulate hot asphalt through the hot asphalt supply tank and selectably connectable to discharge hot asphalt into an intermediate portion of the mixing tank;
   H. a screw conveyor on the frame arranged to receive discharge from the rubber supply hopper an delivery the rubber at one end of the mixing tank;

I. a mixture pump on the frame connected to circulate mixture through the mixing tank having intake and discharge connections at the opposite end of the mixing tank from the screw conveyor delivery end of the mixing tank; and J. connections between the mixture pump discharge and the spray bar to supply mixture thereto for application to the road surface.

2. A portable road-surfacing plant as in claim 1 wherein a supplemental hot asphalt supply line is selectively connectable to the mixing tank from a remote external source of hot asphalt.

3. A portable road-surfacing plant as in claim 1 wherein rotatable mixer paddles are provided in the mixing tank and located between the intermediate hot asphalt discharge in the mixing tank and the mixture pump intake and discharge connections of the mixing tank.